(12) United States Patent
Yezerets et al.

(10) Patent No.: US 9,228,468 B2
(45) Date of Patent: Jan. 5, 2016

(54) TARGETED REGENERATION OF A CATALYST IN AN AFTERTREATMENT SYSTEM

(71) Applicant: Cummins Inc., Columbus, IN (US)

(72) Inventors: Aleksey Yezerets, Columbus, IN (US); Tamas Szailer, Seymour, IN (US); Krishna Kamasamudram, Columbus, IN (US); Neal W. Currier, Columbus, IN (US); Richard J. Ancimer, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/172,259

(22) Filed: Feb. 4, 2014

(65) Prior Publication Data

US 2015/0218992 A1 Aug. 6, 2015

(51) Int. Cl.
*F01N 3/00* (2006.01)
*F01N 3/20* (2006.01)

(52) U.S. Cl.
CPC .............. *F01N 3/208* (2013.01); *F01N 3/2006* (2013.01)

(58) Field of Classification Search
USPC .................... 60/274, 286, 295, 297, 301, 303
See application file for complete search history.

(56) References Cited

U.S. PATENT DOCUMENTS

| | | | |
|---|---|---|---|
| 6,928,806 B2 | 8/2005 | Tennison et al. | |
| 7,191,590 B2 * | 3/2007 | Nagaoka et al. | 60/285 |
| 7,464,542 B2 * | 12/2008 | Toshioka et al. | 60/295 |
| 7,741,239 B2 | 6/2010 | Hartenstein et al. | |
| 7,900,440 B2 * | 3/2011 | Komatsu et al. | 60/285 |
| 7,997,068 B2 * | 8/2011 | Morita et al. | 60/286 |
| 8,307,633 B2 * | 11/2012 | Kojima et al. | 60/286 |
| 8,347,608 B2 * | 1/2013 | Tsujimoto | 60/286 |
| 8,590,293 B2 * | 11/2013 | Nishioka et al. | 60/295 |
| 2008/0271440 A1 | 11/2008 | Xu et al. | |
| 2009/0247392 A1 | 10/2009 | Ghorishi et al. | |
| 2009/0272099 A1 | 11/2009 | Garimella et al. | |

* cited by examiner

*Primary Examiner* — Binh Q Tran
(74) *Attorney, Agent, or Firm* — Taft Stettinius & Hollister LLP

(57) ABSTRACT

Systems, methods and apparatus are disclosed for targeted regeneration of a catalyst device in an exhaust aftertreatment system of an internal combustion engine. The targeted regeneration can include interpreting, initiating, and/or completing a regeneration event for an SCR catalyst or other type of catalyst in response to a catalyst deactivation condition. A catalyst regeneration event includes at least one of exposing the catalyst to a sufficiently high temperature over a time period that removes contaminants from the catalyst and manipulation of the exhaust gas composition to initiate and/or accelerate removal of contaminants from the catalyst.

34 Claims, 3 Drawing Sheets

TARGETED REGENERATION OF A CATALYST IN AN AFTERTREATMENT SYSTEM

BACKGROUND

Selective catalytic reduction (SCR) catalysts are subject to deactivation resulting from the various conditions encountered in the exhaust aftertreatment system. For example, deactivation can result from poisoning of the SCR catalyst caused by various sulfur compounds and hydrocarbon species present in the exhaust gas as well as other deactivation conditions. Other types of catalysts in the exhaust system, such as an ammonia oxidation (AMOX) catalyst, are also subject to deactivation conditions.

In exhaust systems that include, for example, active particulate filter regeneration, the particulate filter regeneration event can serve in part as a regeneration event for the SCR catalyst and other catalysts as well. However, certain aftertreatment systems do not include a particulate filter requiring periodic regeneration. In other systems or operating conditions, the regeneration event for a particulate filter may provide insufficient exposure to regeneration conditions to provide a desired catalyst regeneration outcome. In addition, the conditions which indicate a need for particulate filter regeneration may not indicate a deactivation condition for catalyst regeneration. As a result, the catalyst may be required to operate while contaminated until a particulate filter regeneration event occurs. Therefore, further technological developments are desirable in this area.

SUMMARY

Systems, methods and apparatus are disclosed for targeted regeneration of a catalyst device in an exhaust aftertreatment system of an internal combustion engine. Other embodiments include unique methods, systems, and apparatus to interpret, initiate, and/or complete a regeneration event for an SCR catalyst or other type of catalyst in response to a catalyst deactivation condition. A catalyst regeneration event includes at least one of exposing the catalyst to a sufficiently high temperature over a time period that removes contaminants from the catalyst and manipulation of the exhaust gas composition at the catalyst to initiate and/or accelerate removal of contaminants from the catalyst interface with the exhaust gas.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
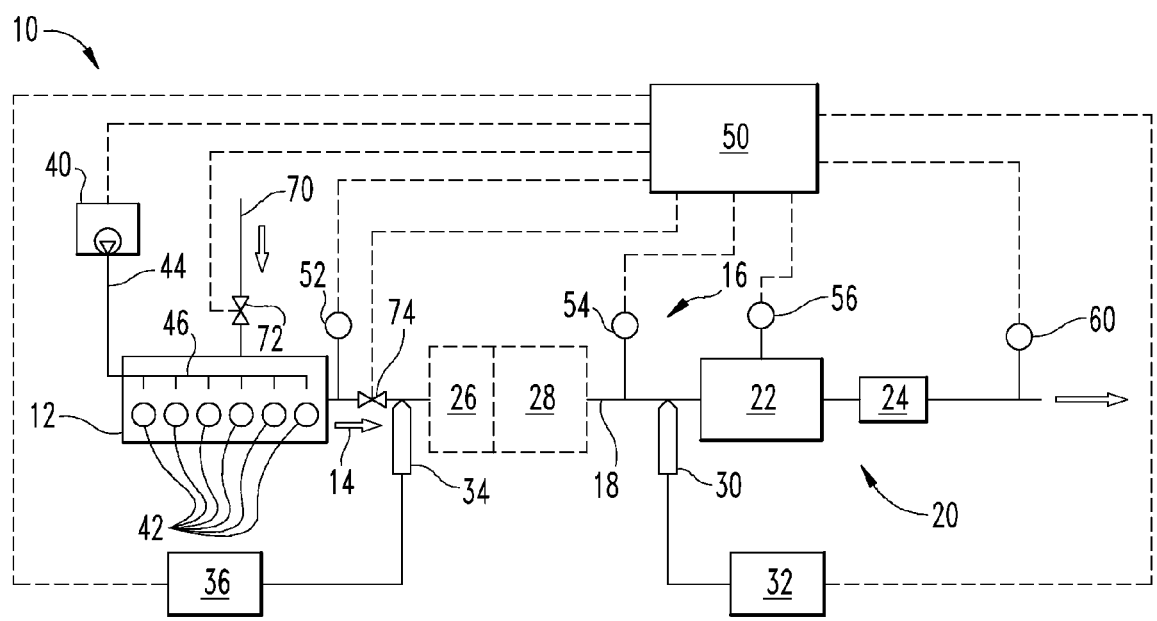
FIG. 1 is a schematic of a system that includes an internal combustion engine connected to an exhaust system with at least one aftertreatment catalyst device and in which the regeneration of at least one catalyst is managed.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, there is shown a system 10 that includes an internal combustion engine 12 that is operable to produce an exhaust gas flow 14 into an exhaust system 16 connected to engine 12. The engine 12 may be any type of internal combustion engine including at least a gasoline, diesel, natural gas engine, combinations thereof, and hybrid power trains including an internal combustion engine for at least one of the power sources. Exhaust system 16 includes at least one exhaust flow path 18 for conveying the exhaust gas to and through an aftertreatment system 20 and an intake system 70 to provide an air flow to engine 12. Intake system 70 may include an intake throttle 72 and/or exhaust system 16 may include an exhaust throttle 74, each or both of which can be controlled by a controller 50 to facilitate control of the thermal output from engine 12. Other embodiments may include a variable geometry turbine (not shown) with a controllable inlet or a turbine with a controllable wastegate (not shown). Aftertreatment system 20 includes at least one catalyst 22 operationally coupled to the at least one exhaust flowpath 18 from engine 12.

In one embodiment, the at least one catalyst 22 is a reduction catalyst that reduces an amount of the $NO_x$ during nominal operation, at least partially converting $NO_x$ to $N_2$ to reduce the emissions of the internal combustion engine 12. In other embodiments, the catalyst 22 includes an ammonia oxidation (AMOX) catalyst 24 that is provided downstream of a NOx reduction catalyst or device, although embodiments without an AMOX catalyst are also contemplated. In one specific embodiment, AMOX catalyst 24 includes a zeolite-based formulation, although other formulations are contemplated.

An example catalyst 22 is a selective reduction catalyst (SCR) forming a portion of an SCR aftertreatment system 20. The SCR aftertreatment system 20, during nominal operation, may reduce $NO_x$ emissions in the presence of a reductant such as ammonia or a hydrocarbon. The ammonia, where present, may be provided by injection of urea, which converts to ammonia after evaporation and hydrolysis in the exhaust gas, and/or by injection of ammonia directly, and/or by other means discussed below. During engine operation, known SCR aftertreatment systems adsorb a portion of sulfur containing compounds passing therethrough, some of which stay on the catalyst semi-permanently and which reduce the effectiveness of the catalyst to catalyze desired reactions for treating the exhaust gases, such as reducing $NO_x$. However, the catalyst may be of any type subject to reversible poisoning and/or deactivation, including at least zeolite, vanadium, base metals, and/or any other type of catalyst known in the art.

Still other embodiments contemplate a catalyst 22 that includes both an SCR catalyst and an AMOX catalyst 24 as separate catalysts in aftertreatment system 20, or as part of a combined catalyst 22. In addition, the SCR catalyst can include one or more catalyst elements in a common housing or in different housings. References herein to catalyst 22 should also be understood to include reference to any one or more reduction catalysts 22, 24.

System 10 may further include one or more other aftertreatment components, such as an oxidation catalyst 26 and/or a particulate filter 28. Oxidation catalyst 26 and/or particulate filter 28 may be upstream of catalyst 22, downstream of catalyst 22, or omitted from aftertreatment system 20. In one particular embodiment, aftertreatment system 20 is designed to operation without particulate filtration and omits a particulate filter 28 from aftertreatment system 20. As a result there are no active regeneration events in the operation of system 10 that are directed to regeneration of a particulate filter.

Exhaust aftertreatment system 20 may include a reductant injector 30 upstream of a catalyst 22 that is an SCR catalyst, but downstream of any catalyst or filter that would oxidize NH3. Reductant injector 30 is supplied with reductant from a reductant source or reservoir 32 and is operable to inject reductant into exhaust flow path 18. In an exemplary embodiment the reductant is a diesel exhaust fluid (DEF) such as urea which decomposes to provide ammonia. Other embodiments utilize different reductants, for example, aqueous solutions of ammonia, anhydrous ammonia, or other reductants suitable for SCR operations. Reductant injected into exhaust flow path 18 is provided to catalyst 22 which is in flow communication with exhaust flow path 18 and is operable to catalyze the reduction of $NO_x$.

Exhaust aftertreatment system 20 may further include a hydrocarbon (HC) injector 34 which is supplied with HC's from an HC source or reservoir 36 and is operationally coupled to the exhaust stream at a position upstream of oxidation catalyst 26. Other embodiments contemplate HC injector 34 is connected to a cylinder of engine 12 and hydrocarbons are added or injected from a fuel source 40 in-cylinder at a timing that is post-combustion so unburned hydrocarbons are carried into the exhaust gas flow 14, or by any other suitable means known in the art.

Exhaust flow path 18, as illustrated schematically in FIG. 1, may be provided in a variety of physical configurations and the order of the aftertreatment components could be changed from that shown in FIG. 1 and, as discussed above, certain components can be eliminated. In an exemplary embodiment exhaust flow path 18 proceeds from the output of a turbocharger of an engine, or directly from an exhaust manifold in systems without a turbocharger, through a conduit to a structure containing an oxidation catalyst 26 and a diesel particulate filter 28 in systems where such devices are provided. The exhaust flow path 18 further proceeds, through a second conduit to a structure containing catalyst 22 that is, for example, a NOx reduction catalyst and through another conduit which outlets to the ambient environment. This embodiment may also include an ammonia oxidation AMOX catalyst 24 at a position downstream of the catalyst 22, which is operable to catalyze the reaction of $NH_3$ which slips past the catalyst 22.

Engine 12 produces exhaust gas flow 14 by combustion of fuel provided from fuel source 40 of a fuelling system. Fuel source 40, in the illustrated embodiment, is connected to a plurality of cylinders 42 of engine 12 with one or more fuel lines 44. In one embodiment, the fuel system is provided with a common rail 46 that distributes fuel to cylinders 42 with one or more injectors (not shown) at each cylinder 42, which are connected to a common rail 46 of the fuel system. It is further contemplated that any suitable connection arrangement with fuel source 40, injection location, and/or injector type can be used to provide fuel directly and/or indirectly to the combustion chambers of cylinders 42.

In certain embodiments, the system 10 further includes a controller 50 structured or configured to perform certain operations to regenerate catalyst 22 and/or catalyst 24. In certain embodiments, the controller 50 forms a portion of a processing subsystem including one or more computing devices having memory, processing, and communication hardware. The controller may be a single device or a distributed device.

System 10 may further include various sensors associated with engine 12 and exhaust system 16 that provide outputs to controller 50 that are processed by controller 50 to control operations to regenerate catalyst 22 and/or catalyst 24. As used herein, unless specified otherwise, a sensor may be a physical sensor that directly measures an operating condition or output of system 10, or a virtual sensor in which the operating condition or output is determined from one or more other sensors and operating parameters. Not all sensors typically associated with system 10 are shown, and the illustrated sensors are provided for purposes of illustration and not limitation.

System 10 includes at least one sensor that provide an output to indicate or determine therefrom a deactivation condition of catalyst 22, and at least one sensor providing output to control operations of system 10 during a regeneration event for catalyst 22, such as a temperature sensor. Additional sensors may be provided, but are not required, to measure the exhaust flow, sense a condition of engine 12 such as engine speed or load, measure an NH3 amount at one or more locations along exhaust system 16, such as at a mid-bed location of catalyst 22 and/or an outlet of catalyst 22, and contamination sensors that provide outputs indicative of a contamination condition of catalyst 22, such as sulfur accumulation amount or deNOx efficiency of catalyst 22. In FIG. 1, additional sensors are shown for purposes of illustration and not limitations, such as a first sensor 52 at the exhaust output of engine 12 that is connected to controller 50 and is operable to indicate at least one of an air-fuel ratio, an exhaust flow rate, or other parameter. System 10 includes at least one second sensor 54 upstream of reduction catalyst 22 that is connected to controller 50 and is operable to indicate at least one of an engine-out NOx amount, an exhaust gas composition, or other parameter at the inlet of catalyst 22. In one embodiment, second sensor 54 is upstream of oxidation catalyst 26 and used to estimate NOx at the inlet to a catalyst 22 that is an SCR catalyst. System 10 also includes at least one third sensor 56 that is operable to provide at least one of a temperature of catalyst 22, an NH3 amount, a contamination condition, or other parameter associated with catalyst 22. System 10 may also include a fourth sensor 60 that is operable to provide an output indicative of the contaminant amounts removed from catalyst 22 and/or catalyst 24 during a regeneration event, although other embodiments are contemplated in which the contaminant removal is measured or calculated virtually from outputs of one or more other sensors.

During operation of engine 12, the exhaust gas flow 14 that is produced contains various chemical poisons and other properties which increase the deactivation of catalyst 22 as exposed thereto over time. Certain deactivation conditions are reversible such as those that result from poisoning by sulfur compounds and various hydrocarbon species in the exhaust gas flow. Other types of reversible changes in the catalyst 22 that occur over time are due to, for example, certain types of masking of the catalyst. For example, zeolite-based SCR catalysts experience several different types of reversible poisoning over time by SOx, adsorbed hydrocarbon species, and other reversible changes.

A deactivation condition of the catalyst 22 can be reversed by heating the catalyst to a high temperature range for a period of time. For systems that include a particulate filter 28, a regeneration event can be initiated for the particulate filter in response to operating conditions of the particulate filter. While such particulate filter regeneration events can also cause at least some reversal of the deactivation of the catalyst 28, such regeneration events are not based on operating conditions of the catalyst and therefore do not optimize the timing and amount of reversal of catalyst deactivation. In addition, in systems that lack a particulate filter or particulate filter regeneration, there are no regeneration events during operation that reverse deactivation of the catalyst. Similarly, other thermal management events, such as a HC desorb and DEF-deposit based removal, are not optimized for the time and amount of reversal needed for catalyst deactivation.

Figure 2:
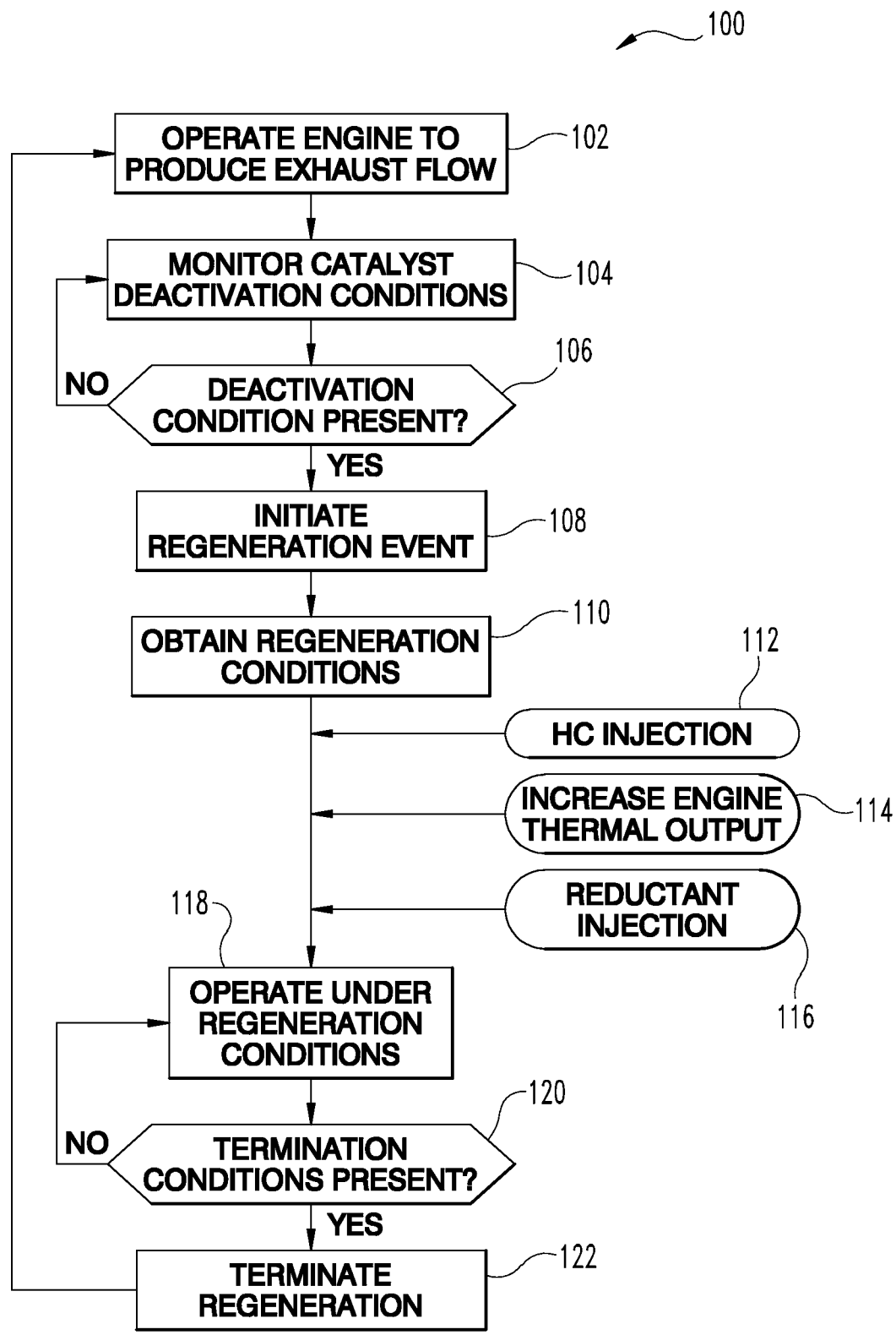
FIG. 2 is a flow diagram of one embodiment of a procedure for regenerating the at least one catalyst of the aftertreatment system.

The schematic flow diagram in FIG. 2 and related description which follows provides an illustrative embodiment of performing procedures dedicated to targeted regeneration of catalyst 22 in response to a deactivation condition of catalyst 22. Operations illustrated are understood to be exemplary only, and operations may be combined or divided, and added or removed, as well as re-ordered in whole or part, unless stated explicitly to the contrary herein. Certain operations illustrated may be implemented by a computer, such as controller 50, executing a computer program product on a computer readable medium, where the computer program product comprises instructions causing the computer to execute one or more of the operations, or to issue commands to other devices to execute one or more of the operations.

Procedure 100 includes an operation 102 to operate engine 12 to produce an exhaust gas flow 14. Procedure 100 further includes an operation 104 to monitor operation of system 10 for a deactivation condition of catalyst 22 resulting during the operation of engine 12. A deactivation condition of catalyst 22 is a condition in which the performance of catalyst 22 falls below a predetermined or desired minimum performance threshold as a result of contaminants and other reversible poisoning and aging of catalyst 22. As discussed further below, a deactivation condition of the catalyst 22 can be indicated by passage of time since a last regeneration event, an amount of time that engine 12 has operated since the last regeneration event, and/or other time based operating parameter. A deactivation condition could alternatively or additionally be indicated based on the amount of contaminants delivered to reduction catalyst based on a known rate of delivery, such as a fuel amount, an oil consumption amount, an engine run-time, a distance traveled, or other operating parameter indicative of contaminant production by engine 12 since a last regeneration event. In still other embodiments, the deactivation condition is determined by a measurable loss in the catalyst performance function, such as a loss in NOx conversion efficiency of a catalyst 22 that is an SCR catalyst. In one embodiment, the NOx conversion efficiency is determined from operating parameters such as the outputs of the upstream and downstream NOx sensors 54, 60 or from a mid-bed or other sensor or sensors on catalyst 22.

Procedure 100 continues at conditional 106 to determine if a deactivation condition, or a number of deactivation conditions, of catalyst 22 is present. If conditional 106 is negative, procedure 100 returns to operation 102 to continue to monitor catalyst deactivation conditions. If conditional 106 is positive, procedure 100 continues at operation 108 to initiate a regeneration event for catalyst 22. In further embodiments, additional checks may be required before initiating a catalyst regeneration event, such as determining whether operating conditions are suitable for the regeneration event, or whether an operator input has been received that an impact of a regeneration event cannot be tolerated at a particular time. In still other embodiments, a positive indication at conditional 106 can provide an output to an indicator or service light indicating catalyst reversal at a next service event is required.

Once a regeneration event is initiated at operation 108, procedure 100 includes an operation 110 to operate engine 12 and exhaust system 16 to obtain regeneration conditions in the aftertreatment system 20 that regenerate catalyst 22 and reverse the catalyst deactivation condition. Operating engine 12 and/or exhaust system 16 to obtain regeneration conditions can include any one or combination of operations that increase the exhaust gas temperature above a threshold regeneration temperature and/or in a regeneration temperature range, and to maintain the exhaust gas temperature above the regeneration temperature for a period of time sufficient to completely or partially regenerate catalyst 22.

In one embodiment, the regeneration conditions are obtained by a hydrocarbon (HC) injection operation 112 to inject unburned hydrocarbons into the exhaust gas flow 14 to oxidize across oxidation catalyst 26 and increase the exhaust gas temperature. The injection of hydrocarbons from HC source 36 can occur with HC injector 34 and/or by late injection of hydrocarbons in cylinders 42 from fuel source 40. In addition or alternatively, procedure 100 includes an operation 114 to increase the thermal output of engine 12 by controlling engine operations. Increasing the thermal output of engine 12 can include, for example, increasing a load on engine 12, engine braking in one or more of cylinders 42 of engine 12, manipulating one or more actuators associated with an intake throttle, an exhaust throttle, a wastegate of a turbine, an inlet of a variable geometry turbine, an EGR valve associated with an EGR system and/or an EGR cooler, a bypass around an intake air cooler, and/or an injection timing of fuel into cylinders 42 to increase the temperature of the exhaust gas exiting the cylinder. In still a further embodiment, obtaining regeneration conditions additionally or alternatively includes a reductant injection operation 116 to change a composition of the exhaust gas flow at the catalyst 22 so that the exhaust gas includes species favorable for removal and/or acceleration of the removal of contaminants on the catalyst 22, such as sulfur, are provided under the regeneration conditions.

Once regeneration conditions are obtained at operation 110, procedure 100 includes an operation 118 to operate the system 10 under the regeneration conditions to reverse the deactivation of catalyst 22. Operation 118 includes regenerating catalyst 22 to reverse a deactivation condition due to sulfur, HC, and other poisonings and conditions. In still further embodiments, such as where catalyst 22 is an SCR catalyst, the regeneration conditions include controlling the fuelling system to operate at an air-fuel ratio in a lean condition. Regeneration while under a lean condition avoids the hydrocarbon poisoning and other potential damage to the reduction catalyst which could result if a rich condition were present during regeneration. In other embodiments, exhaust conditions are produced in which there is effectively no oxygen content in the exhaust gas to make conditions more conducive to desulphation of the catalyst 22. This can be achieved by making the entire exhaust gas reducing, or making conditions local to the catalyst that are reducing, such as at the washcoat level or at sections of the catalyst 22.

In one embodiment, regenerating catalyst 22 includes an operation to provide a fluid stream having a reductant amount and a temperature for regeneration. An example regeneration temperature is between 400-700° C. inclusive, and the reductant amount includes an amount of urea, ammonia, and/or hydrocarbons. Another example operation to regenerate the catalyst 22 includes increasing the thermal output of engine 12 by adjusting an engine combustion parameter. Example combustion parameters include, without limitation, increasing temperatures of the exhaust gas exiting the cylinders, adjusting air to fuel ratios, retarding injection timing and/or the injection rate profile, adjusting EGR fractions, valve timing, and/or other parameters that, in a particular system, may be tested and known to increase the thermal output of engine 12 and increase the exhaust gas temperature. An example procedure further includes performing operation 118 to regenerate catalyst 22 by operating system 10 to provide the exhaust gas flow at the regeneration temperature range for a time period, such as between 10 minutes and 3 hours, an operation to remove an amount of the contaminants adsorbed by catalyst 22, and/or an operation restore a performance function capability of catalyst 22. In a specific embodiment, the regeneration temperature range includes a target temperature of about 550° C. and the time period is 10 minutes, and exhaust gas flow temperatures above 400° C. are counted in the time period. Other specific conditions are also contemplated depending on the system, catalyst formulation, and operating conditions.

A conditional 120 determines if termination conditions are present to end the operation of system 10 under the regeneration conditions. If conditional 120 is negative, procedure 100 returns to operation 118 to continue to operate system 10 under the regeneration conditions. If conditional 120 is positive, procedure 100 proceeds at operation 122 to terminate regeneration, and then continue at operation 102 to continue to operate engine 12 to produce an exhaust gas flow until engine operation is terminated; procedure 100 continues until engine operation is terminated.

The determination that termination conditions are present to terminate regeneration of catalyst 22 is important to avoid unnecessary consumption of fuel, hydrocarbons, and/or reductant. The determination that termination conditions are present at conditional 120 can include, for example, accumulating a predetermined amount of time of operation in the regeneration temperature range in a time-temperature accumulation condition determination. The time-temperature accumulation condition that terminates the regeneration event can be determined from a look-up table or schedule stored in a memory of the controller 50. The time-temperature accumulation condition indicating termination of regeneration can be in response to a complete or partial regeneration of catalyst 22.

Additionally or alternatively, the regeneration event can be terminated in response to a virtual sensor that estimates in real time the amount of contaminant removed, and therefore the amount of reversal of a deactivation condition, based on the kinetics of contaminant removal from the catalyst 22 as a function of time and temperature of the exhaust gas flow and/or the catalyst. Such a determination can be coupled with a determination of a contaminant amount accumulated by catalyst 22 prior to initiation of the regeneration event. Additionally or alternatively, the regeneration event can be terminated in response to a physical sensor downstream of the catalyst 22, such as sensor 60, that measures in real time the amount of contaminants removed from catalyst 22. The physical sensor can be a dedicated sensor 60 that is configured to detect the removed contaminant, or a sensor 60 that is cross-sensitive to the removed contaminant and provides a reliable measurement of the contaminant removed when the regeneration conditions are present. For example, in one embodiment sensor 60 is a NOx sensor cross-sensitive to sulfur and/or NH3, and the absence of NOx and NH3 under regeneration conditions provides a reliable measurement of the sulfur amount released from catalyst 22 during the regeneration event. The amount of contaminant removed indicating termination of the regeneration event can include removal of, for example, at least 50% of the accumulated contaminant(s), removal of at least 80% of the accumulated contaminant(s), or removal of at least 90% of the accumulated contaminant(s).

Alternatively or additionally, the regeneration event can be terminated in response to a measurable increase in the catalyst performance function, or the attainment of a threshold level of performance function, such as a NOx conversion efficiency of a catalyst 22 that is an SCR catalyst. In one embodiment, the threshold level of performance includes a performance level that is at least 70%, at least 80%, and at least 90% of that of an uncontaminated catalyst. The attainment of a threshold level of performance under regeneration conditions can be coupled with a time-out limit that terminates regeneration in the event a lack of progression in improving the performance function, or the inability to obtain the threshold performance level, in a predetermined amount of time is not attained during the regeneration event.

In certain embodiments, the controller 50 includes one or more modules structured to functionally execute the operations of the controller to regenerate catalyst 22. The one or more modules are configured to interpret a catalyst deactivation condition, initiate a catalyst regeneration event in response to the catalyst deactivation condition, control operations under catalyst regeneration conditions, and terminate the catalyst regeneration event in response to a catalyst regeneration termination condition. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or on computer readable medium, and modules may be distributed across various hardware components. More specific descriptions of certain embodiments of controller operations are included in the section referencing FIG. 3.

Certain operations described herein include operations to interpret or determine one or more parameters. Interpreting and/or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 3:
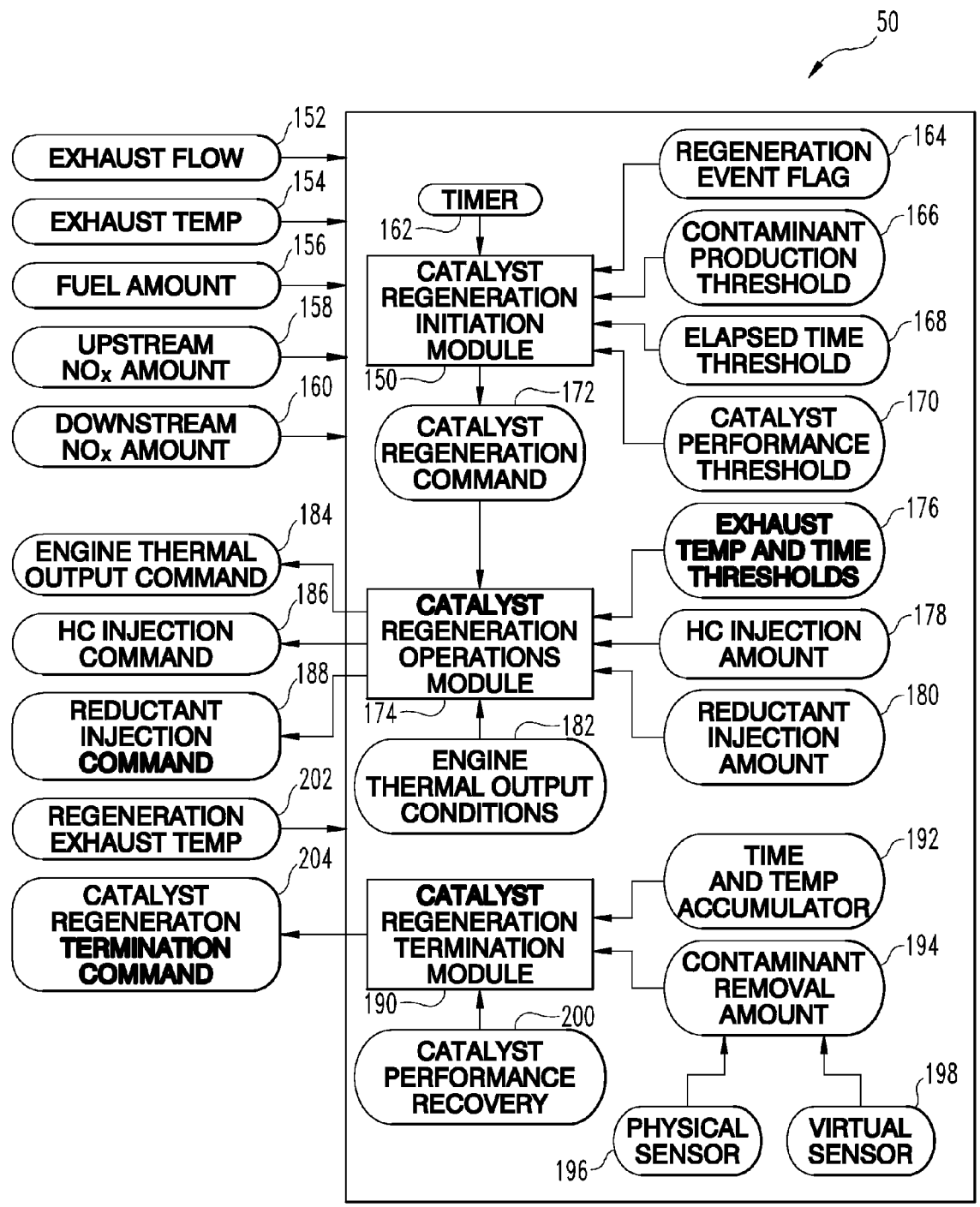
FIG. 3 is a schematic of one embodiment of a controller apparatus for regeneration of at least one catalyst of an aftertreatment system.

Controller 50 of FIG. 3 includes a number of modules structured to functionally execute operations to detect and/or regenerate a deactivation condition of reduction catalyst 22 in response to one or more operating parameters from the sensors of system 10. An example controller 50 includes a catalyst regeneration initiation module 150 that interprets a deactivation condition of the catalyst 22. The operation to interpret the deactivation condition includes any operation or combination of operations that provide a determination of a deactivation condition in response to an estimate or measurement of the amount of contaminants or other poisons present on the catalyst that reduce or inhibit the catalyst performance.

Example and non-limiting inputs to catalyst regeneration initiation module 150 include an exhaust flow 152, an exhaust temperature 154, a fuelling amount 156, an upstream NOx amount 158, and a downstream NOx amount 160. Catalyst regeneration initiation module 150 further receives a timer input 162 and a flag 164 indicating a time and/or indication of an occurrence a previous regeneration event and/or a type of a previous regeneration or thermal management event. The previous regeneration/thermal management event can be any one or combination of a particulate filter regeneration event, a HC desorb event, and a DEF deposit removal event. For example, if a previous regeneration event for a particulate filter has occurred in the temperature range for the catalyst regeneration event, then the time for particulate filter regeneration can be counted toward the time for the catalyst regeneration event depending on the elapsed time between the events. If a thermal event such a HC desorb event occurred but at a temperature lower than the catalyst regeneration event, then the HC desorb event would not count to lessen the duration of the catalyst regeneration event.

Various thresholds are provided that, when reached, indicate a deactivation condition of catalyst 22. Examples of non-limiting thresholds include a contaminant production threshold 166 that is determined by, for example, determining the fuel amount consumed since the last regeneration event. Other example operating parameters indicating a contaminant production amount include, for example, an oil consumption amount, miles traveled since the last regeneration event, engine run-time, engine load, and combinations of these. When the measured contaminant production amount exceeds the contaminant production threshold 166, catalyst regeneration initiation module 150 outputs a catalyst regeneration command 172.

Another example threshold includes an elapsed time threshold 168 since the last regeneration event. The time parameter that is measured can be, for example, an engine run-time, an engine run-time above a certain threshold, or other time-based parameter. When the elapsed time parameter crosses the elapsed time threshold 168, catalyst regeneration initiation module 150 outputs the catalyst regeneration command 172. Yet another example threshold includes a catalyst performance threshold 170 indicative of an unacceptable loss of catalyst performance in, for example, removing NOx from the exhaust gas flow. In one embodiment, the catalyst performance function is a deNOx efficiency of catalyst 22, and the current deNOx efficiency of the catalyst 22 can be determined, for example, from upstream and downstream NOx amounts 158, 160. When the current deNOx efficiency is reduced to a level that is less than the catalyst performance threshold 170, catalyst regeneration initiation module 150 outputs the catalyst regeneration command 172.

Controller 50 further includes a catalyst regeneration operations module 174 that is configured to interpret one or more of an exhaust temperature and time threshold 176, a HC injection amount 178, a reductant injection amount 180, and engine thermal output conditions 182 to control operations of engine 12 and/or exhaust system 16 to output one or more commands that produce exhaust temperature conditions and/or exhaust gas compositions that are in a regeneration temperature range for a predetermined time period.

In one embodiment, catalyst regeneration operations module 174 determines an engine thermal output command 184 that adjusts one or more actuators to control intake flow, fuel flow, exhaust flow, and/or EGR flow to produce the regeneration temperature condition. In addition or alternatively, catalyst regeneration operations module 174 determines an HC injector command 186 that operates HC injector 34 and/or the fuel injectors of the fuelling system to provide an HC amount into the exhaust gas flow by post-combustion injection in cylinders 42 and/or directly into the exhaust gas flow 14. In addition or alternatively, catalyst regeneration operations module 174 determines a reductant injector command 188 to reductant injector 30 that provides a reductant amount into the exhaust gas flow to produce an exhaust gas composition at catalyst 22 that is favorable for contaminant removal under the regeneration temperature conditions.

The engine thermal output command 184, HC injector command 186, and/or reductant injector command 188 are provided to give sufficient temperature and reductant activity to regenerate the catalyst 22 by removal of the contaminants and to reverse other reversible conditions associated therewith. The HC injector and reductant injector commands 186, 188 may be any amount, and may depend upon the available HC and/or reductant amount (e.g. as deliverable by an HC and/or reductant source) and by the amount of time available to perform the regeneration.

Another embodiment for producing the required exhaust temperature conditions for regeneration includes engaging a direct heater such as a burner or electric heater device. Still another example includes providing external air that is heated to the catalyst 22, such as by directing air into the exhaust system 16, and/or by removing the catalyst 22 from the aftertreatment system 20 and providing it to an external regeneration device. An external oven or other heater, in certain embodiments, elevates the temperature of the exhaust gases by heating the oven and thereby heating gases within the catalyst 22. In still other embodiments, a synthetic gas, CO, or H2 is provided upstream of an oxidation catalyst 26 such as from a syn-gas generator or reformer.

Controller 50 further includes a catalyst regeneration termination module 190 that is configured to output a catalyst regeneration termination command 204 to terminate regeneration of catalyst 22. The catalyst regeneration termination command 204 is determined in response to one or more regeneration termination conditions being satisfied. In one embodiment, the regeneration termination conditions include a time and temperature accumulation condition 192. During the regeneration event, the regeneration exhaust temperature 202 is measured and timer 162 measures the time during which the regeneration exhaust temperature 202 is provided, and catalyst regeneration termination module 190 outputs the catalyst regeneration termination command 204 in response to the time and temperature accumulation condition 192 being satisfied to terminate the regeneration event and return to nominal operations.

In another embodiment, catalyst regeneration termination module 190 interprets a contaminant removal amount 194 via at least one of a physical sensor 196 and a virtual sensor 198. When the contaminant removal amount 194 exceeds, approaches, or is a substantial portion of the contaminant production amount, catalyst regeneration termination module 190 outputs the catalyst regeneration termination command 204 to terminate the regeneration event and return to nominal operations.

In another embodiment, catalyst regeneration termination module 190 interprets a catalyst performance recovery 200 in response to, for example, a current deNOx efficiency in response to the upstream NOx amount 158 and the downstream NOx amount 160 and/or mid-bed NOx/NH3 amount. When the performance of catalyst 22 has recovered, for example, to a desired performance level or exceeds a performance recovery threshold, catalyst regeneration termination module 190 outputs the catalyst regeneration termination command 204 to terminate the regeneration event and return to nominal operations. Combinations of the above could also be used and/or with a timer that terminates the regeneration event should a regeneration event time threshold be reached.

As is evident from the figures and text presented above, a variety of aspects, embodiments and refinements of the present disclosure are contemplated. According to one aspect, a method includes operating an internal combustion engine to produce an exhaust gas flow through an aftertreatment system including at least one catalyst; determining at least one parameter associated with operation of the internal combustion engine that indicates a deactivation condition of the catalyst where the deactivation condition is caused at least in part by accumulation of contaminants on the catalyst; in response to the deactivation condition, initiating a regeneration event to regenerate the catalyst by increasing a temperature of the exhaust gas flow to a regeneration temperature range; operating the internal combustion engine during the regeneration event with the exhaust gas flow in the regeneration temperature range for a period of time to regenerate the catalyst; and terminating the regeneration event in response to a determination that at least one regeneration event termination condition is present.

In one embodiment of the method, the at least one parameter that indicates the deactivation condition includes an elapse of time since a previous regeneration event. In another embodiment of the method, the at least one parameter that indicates the deactivation condition includes an amount of at least one contaminant delivered to the at least one catalyst exceeding a threshold amount. In a refinement of this embodiment, the amount of the at least one contaminant is determined as a function of at least one of an amount of fuel consumed, an amount of oil consumed, and an engine runtime since a previous regeneration event.

In another embodiment of the method, the at least one parameter that indicates the deactivation condition includes a measurable loss in a performance function of the catalyst. In a refinement of this embodiment, the catalyst is a NOx reduction catalyst and the performance function is a NOx reduction efficiency, and the NOx reduction efficiency is a function of a first NOx amount upstream of the catalyst and a second NOx amount downstream of the catalyst.

In another embodiment of the method, increasing the temperature of the exhaust gas flow includes at least one of increasing a thermal output of the internal combustion engine and injecting hydrocarbons into the exhaust gas flow upstream of an oxidation catalyst in the aftertreatment system with the oxidation catalyst upstream of the catalyst. In another embodiment, the method further includes injecting a reductant into the exhaust gas flow upstream of the catalyst to change a composition of the exhaust gas flow during the regeneration event.

In another embodiment of the method, the catalyst is a selective catalyst reduction catalyst and operating the internal combustion engine with the exhaust gas flow in the regeneration temperature range to regenerate the catalyst includes operating the internal combustion in a lean fuelling mode during the regeneration event. In another embodiment of the method, the at least one termination condition includes a time and temperature accumulation in the regeneration temperature range exceeding a threshold amount.

In another embodiment of the method, the at least one termination condition includes an amount of contaminant removed from the catalyst during the regeneration event exceeding a threshold amount of contaminant accumulated on the catalyst. In a refinement of this embodiment, the amount of contaminant removed is determined by a virtual sensor as a function of contaminant removal kinetics of the catalyst in response to time and temperature conditions of the exhaust gas flow during the regeneration event. In another refinement, the amount of contaminant removed is determined by a physical sensor downstream of the catalyst that measures in real time the contaminants removed from the catalyst during the regeneration event. In further refinements, the threshold amount is at least 50% of the contaminant accumulated on the catalyst, at least 80% of the contaminant accumulated on the catalyst, or at least 90% of the contaminant accumulated on the catalyst.

In another embodiment, the catalyst is an ammonia oxidation catalyst. In yet another embodiment, the aftertreatment system lacks a particulate filter. In yet a further embodiment, the regeneration temperature range is between 400-700° C. inclusive and the time period is between '0 minutes and 3 hours. In one refinement of this embodiment, the regeneration temperature range includes a target temperature of about 550° C. and the time period is 10 minutes, and exhaust gas flow temperatures above 400° C. are counted in the time period.

According to another aspect, a method includes operating a system including an internal combustion engine to produce an exhaust gas flow through an aftertreatment system including at least one selective catalyst reduction (SCR) catalyst; determining at least one parameter associated with operation of the system that indicates a deactivation condition of the SCR catalyst, wherein the deactivation condition is caused at least in part by accumulation of sulphur on the SCR catalyst; in response to the deactivation condition, initiating a regeneration event to regenerate the SCR catalyst by increasing a temperature of the exhaust gas flow to a regeneration temperature range; operating the internal combustion engine during the regeneration event with the exhaust gas flow in the regeneration temperature range for a period of time to regenerate the catalyst; and terminating the regeneration event in response to a determination that at least one regeneration event termination condition is present.

In one embodiment, the aftertreatment system includes at least one of a second catalyst and a particulate filter upstream of the SCR catalyst that is thermally regenerated in a second thermal regeneration event that is distinct from the regeneration event to regenerate the SCR catalyst. In another embodiment of the method, the at least one termination condition includes a measurable increase in a catalyst performance function of the catalyst by a threshold amount. In a refinement of this embodiment, the catalyst is an SCR catalyst and the catalyst performance function is a deNOx efficiency of the SCR catalyst.

According to another aspect, a system includes an internal combustion engine operable to produce an exhaust gas flow and an exhaust system connected to the internal combustion engine to receive the exhaust gas flow that includes an aftertreatment system with at least one catalyst. The system also includes a plurality of sensors operable to output signals indicative of operating parameters of the internal combustion engine, the exhaust gas flow, and the at least one catalyst and a controller operably connected to receive the output signals from the plurality of sensors. The controller includes a catalyst regeneration initiation module configured to interpret a deactivation condition of the at least one catalyst in response to the operating parameters and output a catalyst regeneration command to initiate a catalyst regeneration event. The controller also includes a catalyst regeneration operations module configured to operate at least one of the internal combustion engine and the exhaust system to produce the regeneration event in response to the catalyst regeneration command where the regeneration event includes a temperature of the exhaust gas flow in a regeneration temperature range for a period of time. The controller also includes a catalyst regeneration termination module configured to interpret at least one regeneration termination condition during the regeneration event and output a catalyst regeneration termination command in response to the regeneration termination condition.

In one embodiment of the system, the catalyst regeneration initiation module is configured to interpret the deactivation condition in response to at least one of an elapsed time since a last regeneration event, a contaminant production by the internal combustion since a last regeneration event exceeding a threshold amount, and a performance function of the catalyst falling below a performance threshold.

In another embodiment of the system, the catalyst regeneration operations module is configured to increase a temperature of the exhaust gas flow to the regeneration temperature range by increasing a thermal output of the internal combustion engine. In a refinement of this embodiment, the aftertreatment system includes an oxidation catalyst and the exhaust system includes a hydrocarbon injector connected to the exhaust system upstream of the oxidation catalyst and the hydrocarbon injector is connected to a hydrocarbon source. The catalyst regeneration operations module is configured to increase the temperature of the exhaust gas flow to the regeneration temperature range by outputting a hydrocarbon injector command to add a hydrocarbon amount to the exhaust gas flow upstream of the oxidation catalyst of the aftertreatment system. In a further refinement, the hydrocarbon source is a fuel source of the internal combustion engine and the hydrocarbon injector is a fuel injector connected with at least one cylinder of the internal combustion engine, and the hydrocarbon amount is added post-combustion in the at least one cylinder.

In another refinement, the catalyst is a SCR catalyst and the aftertreatment system includes a reductant injector connected to the exhaust system upstream of the SCR catalyst, and the reductant injector is connected to a reductant source. The catalyst regeneration operations module is configured to output a reductant injector command during the regeneration event to change a composition of the exhaust gas flow at the SCR catalyst with the injected reductant.

In another embodiment of the system, the catalyst regeneration termination module is configured to interpret the regeneration termination condition in response to at least one of a time and temperature accumulation limit being reached during the regeneration event, a threshold amount of at least one contaminant being removed from the catalyst, and a recovery of a performance function of the catalyst. In yet another embodiment, the regeneration temperature range is between 550-700° C. inclusive and the time period is between 30 minutes and 3 hours. In still another embodiment, the aftertreatment system lacks a particulate filter.

In another embodiment of the system, a fuelling system is operable to provide fuel to at least one cylinder of the internal combustion engine. The catalyst regeneration operations module is configured to output a fuelling command to the fuelling system that operates the internal combustion engine in a lean fuelling mode during the regeneration event.

In another aspect of the system, the controller is configured to interpret a deactivation condition of the at least one catalyst in response to the operating parameters and output a catalyst regeneration command to initiate a catalyst regeneration event; operate at least one of the internal combustion engine and the exhaust system to produce the regeneration event in response to the catalyst regeneration command where the regeneration event includes a temperature of the exhaust gas flow in a regeneration temperature range for a period of time; and interpret at least one regeneration termination condition during the regeneration event and output a catalyst regeneration termination command in response to the regeneration termination condition.

In a further embodiment, the system includes a fuelling system operable to provide fuel to at least one cylinder of the internal combustion engine, and the controller is configured to control a fuelling amount form the fuelling system to operate the internal combustion engine in a lean fuelling mode during the regeneration event.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a system including an internal combustion engine to produce an exhaust gas flow through an aftertreatment system including at least one catalyst;
   determining at least one parameter associated with operation of the system that indicates a deactivation condition of the catalyst, wherein the deactivation condition is caused at least in part by accumulation of contaminants on the catalyst;
   in response to the deactivation condition, initiating a regeneration event to regenerate the catalyst by increasing a temperature of the exhaust gas flow to a regeneration temperature range;
   operating the internal combustion engine during the regeneration event with the exhaust gas flow in the regeneration temperature range for a period of time to regenerate the catalyst; and
   terminating the regeneration event in response to a determination that at least one regeneration event termination condition is present, wherein the determination that the at least one regeneration event termination condition is present includes the determination that a measurable increase in a deNOx efficiency of the at least one catalyst has occurred during the regeneration event that exceeds a performance recovery threshold.

2. The method of claim 1, wherein the at least one parameter that indicates the deactivation condition includes an elapse of time since a previous regeneration event.

3. The method of claim 1, wherein the at least one parameter that indicates the deactivation condition includes an amount of at least one contaminant delivered to the at least one catalyst exceeding a threshold amount since a previous regeneration event.

4. The method of claim 3, wherein the amount of the at least one contaminant is determined as a function of at least one of an amount of fuel consumed by the internal combustion engine, an amount of oil consumed by the internal combustion engine, a distance traveled under power by the internal combustion engine, and an engine run-time of the internal combustion engine since a previous regeneration event.

5. The method of claim 1, wherein the at least one parameter that indicates the deactivation condition includes a measurable loss in a performance function of the catalyst.

6. The method of claim 5, wherein the catalyst is a NOx reduction catalyst and the performance function is a NOx reduction efficiency, wherein the NOx reduction efficiency is a function of a first NOx amount upstream of the catalyst and a second NOx amount downstream of the catalyst.

7. The method of claim 1, wherein increasing the temperature of the exhaust gas flow includes at least one of increasing a thermal output of the internal combustion engine and injecting hydrocarbons into the exhaust gas flow upstream of an oxidation catalyst in the aftertreatment system, wherein the oxidation catalyst is upstream of the catalyst.

8. The method of claim 1, further comprising injecting a reductant into the exhaust gas flow upstream of the catalyst to change a composition of the exhaust gas flow at the catalyst during the regeneration event.

9. The method of claim 8, wherein the reductant includes at least one of a diesel exhaust fluid and hydrocarbons.

10. The method of claim 1, wherein the at least one termination condition includes a time and temperature accumulation in the regeneration temperature range exceeding a threshold amount.

11. The method of claim 1, wherein the at least one termination condition includes an amount of contaminant removed from the catalyst during the regeneration event exceeding a threshold amount of contaminant that is accumulated on the catalyst.

12. The method of claim 11, wherein the amount of contaminant removed is determined by a virtual sensor as a function of contaminant removal kinetics of the catalyst in response to time and temperature conditions of the exhaust gas flow during the regeneration event.

13. The method of claim 11, wherein the amount of contaminant removed is determined by a physical sensor associated with the catalyst that measures in real time the contaminant removal from the catalyst during the regeneration event.

14. The method of claim 11, wherein the threshold amount is at least 50% of the contaminant accumulated on the catalyst.

15. The method of claim 11, wherein the threshold amount is at least 90% of the contaminant accumulated on the catalyst.

16. The method of claim 1, wherein the catalyst is an ammonia oxidation catalyst.

17. The method of claim 1, wherein the regeneration temperature range is between 400-700° C. inclusive and the time period is between 10 minutes and 3 hours.

18. The method of claim 17, wherein the regeneration temperature range includes a target temperature of about 550° C. and the time period is 10 minutes, and exhaust gas flow temperatures above 400° C. are counted in the time period.

19. A method comprising:
operating a system including an internal combustion engine to produce an exhaust gas flow through an aftertreatment system including at least one selective catalyst reduction (SCR) catalyst;
determining at least one parameter associated with operation of the system that indicates a deactivation condition of the SCR catalyst, wherein the deactivation condition is caused at least in part by accumulation of sulphur on the SCR catalyst;
in response to the deactivation condition, initiating a regeneration event to regenerate the SCR catalyst by increasing a temperature of the exhaust gas flow to a regeneration temperature range;
operating the internal combustion engine during the regeneration event with the exhaust gas flow in the regeneration temperature range for a period of time to regenerate the catalyst; and
terminating the regeneration event in response to a determination that at least one regeneration event termination condition is present, wherein the at least one regeneration event termination condition include a measurable increase in a deNOx efficiency of the SCR catalyst above a performance recovery threshold.

20. The method of claim 19, wherein the aftertreatment system includes at least one of a second catalyst and a particulate filter upstream of the SCR catalyst that is thermally regenerated in a second thermal regeneration event that is distinct from the regeneration event to regenerate the SCR catalyst.

21. A system, comprising:
an internal combustion engine operable to produce an exhaust gas flow;
an exhaust system connected to the internal combustion engine to receive the exhaust gas flow, the exhaust system including an aftertreatment system with at least one catalyst;
a plurality of sensors operable to output signals indicative of operating parameters of the internal combustion engine, the exhaust gas flow, and the at least one catalyst;
a controller operably connected to receive the output signals from the plurality of sensors, the controller comprising:
a catalyst regeneration initiation module configured to interpret a deactivation condition of the at least one catalyst in response to the operating parameters and output a catalyst regeneration command to initiate a catalyst regeneration event;
a catalyst regeneration operations module configured to operate at least one of the internal combustion engine and the exhaust system to produce the regeneration event in response to the catalyst regeneration command, wherein the regeneration event includes a temperature of the exhaust gas flow into the at least one catalyst in a regeneration temperature range for a period of time; and
a catalyst regeneration termination module configured to interpret at least one regeneration termination condition during the regeneration event and output a catalyst regeneration termination command in response to the regeneration termination condition, wherein the at least one regeneration event termination condition includes a measurable increase in a deNOx efficiency of the at least one catalyst during the regeneration event that exceeds a performance recovery threshold.

22. The system of claim 21, wherein the catalyst regeneration initiation module is configured to interpret the deactivation condition in response to at least one of an elapsed time since a last regeneration event, a contaminant production by the internal combustion since a last regeneration event exceeding a threshold amount, and a performance function of the catalyst decreasing below a performance level threshold.

23. The system of claim 21, wherein the catalyst regeneration operations module is configured to increase a temperature of the exhaust gas flow to the regeneration temperature range by increasing a thermal output of the internal combustion engine.

24. The system of claim 21, wherein the aftertreatment system includes an oxidation catalyst and the exhaust system includes a hydrocarbon injector upstream of the oxidation catalyst, the hydrocarbon injector being connected to a hydrocarbon source, and the catalyst regeneration operations module is configured to increase the temperature of the exhaust gas flow to the regeneration temperature range by outputting a hydrocarbon injector command to add a hydrocarbon amount to the exhaust gas flow upstream of the oxidation catalyst of the aftertreatment system.

25. The system of claim 24, wherein the hydrocarbon source is a fuel source of the internal combustion engine and the hydrocarbon injector is a fuel injector connected with at least one cylinder of the internal combustion engine, and the hydrocarbon amount is added post-combustion in the at least one cylinder.

26. The system of claim 24, wherein the catalyst is a selective catalytic reduction (SCR) catalyst and the aftertreatment system includes a reductant injector connected to the exhaust system upstream of the SCR catalyst, the reductant injector being connected to a reductant source, wherein the catalyst regeneration operations module is configured to output a reductant injector command during the regeneration event to change a composition of the exhaust gas flow at the SCR catalyst with the injected reductant.

27. The system of claim 23, wherein the catalyst is a selective catalytic reduction (SCR) catalyst and the aftertreatment system includes a reductant injector connected to the exhaust system upstream of the SCR catalyst, the reductant injector being connected to a reductant source, wherein the catalyst regeneration operations module is configured to output a reductant injector command during the regeneration event to change a composition of the exhaust gas flow at the SCR catalyst with the injected reductant.

28. The system of claim 21, wherein the catalyst regeneration termination module is further configured to interpret the regeneration termination condition in response to at least one of a time and temperature accumulation limit being reached during the regeneration event, and a threshold amount of at least one contaminant being removed from the catalyst.

29. The system of claim 21, wherein the regeneration temperature range is between 400-700° C. inclusive and the time period is between 10 minutes and 3 hours.

30. A system, comprising:
an internal combustion engine operable to produce an exhaust gas flow;
an exhaust system connected to the internal combustion engine to receive the exhaust gas flow, the exhaust system including an aftertreatment system with at least one catalyst;
a plurality of sensors operable to output signals indicative of operating parameters of the internal combustion engine, the exhaust gas flow, and the at least one catalyst;
a controller operably connected to receive the output signals from the plurality of sensors, the controller is configured to:
interpret a deactivation condition of the at least one catalyst in response to the operating parameters and output a catalyst regeneration command to initiate a catalyst regeneration event;
operate at least one of the internal combustion engine and the exhaust system to produce the regeneration event in response to the catalyst regeneration command, wherein the regeneration event includes a temperature of the exhaust gas flow into the at least one catalyst in a regeneration temperature range for a period of time; and
interpret at least one regeneration event termination condition during the regeneration event and output a catalyst regeneration event termination command in response to the regeneration event termination condition, wherein the at least one regeneration event termination condition includes a measurable increase in a deNOx efficiency of the at least one catalyst during the regeneration event that exceeds a performance recovery threshold.

31. The method of claim 1, wherein operating the internal combustion engine during the regeneration event includes controlling fuelling to the internal combustion engine to be a lean air-fuel ratio.

32. The method of claim 20, wherein operating the internal combustion engine during the regeneration event includes controlling fuelling to the internal combustion engine to be a lean air-fuel ratio.

33. The system of claim 21, wherein the catalyst regeneration operations module is configured to operate the internal combustion engine at a lean air-fuel ratio to produce the regeneration event in response to the catalyst regeneration command.

34. The system of claim 30, wherein the controller is configured to operate the internal combustion engine at a lean air-fuel ratio during the regeneration event.

* * * * *